United States Patent
Smith et al.

(10) Patent No.: US 6,930,652 B2
(45) Date of Patent: *Aug. 16, 2005

(54) SIMPLIFIED ANTENNA STRUCTURES FOR LOGGING TOOLS

(75) Inventors: David L. Smith, Stafford, TX (US); Anthony L Collins, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 282 days.

This patent is subject to a terminal disclaimer.

(21) Appl. No.: 10/065,599

(22) Filed: Nov. 1, 2002

(65) Prior Publication Data

US 2003/0184488 A1 Oct. 2, 2003

Related U.S. Application Data

(63) Continuation-in-part of application No. 10/113,686, filed on Mar. 29, 2002, now Pat. No. 6,690,170.

(51) Int. Cl.[7] .............................. H01Q 1/36; G01V 3/10
(52) U.S. Cl. ........................ 343/895; 343/719; 343/867; 324/339
(58) Field of Search ................................. 343/787, 719, 343/725, 726, 742, 867, 895; 324/339, 343

(56) References Cited

U.S. PATENT DOCUMENTS

| | | |
|---|---|---|
| 3,723,856 A | 3/1973 | Brown |
| 4,319,191 A | 3/1982 | Meador et al. |
| 5,602,557 A | 2/1997 | Duerr |
| 5,633,649 A | 5/1997 | Grossi et al. |
| 5,781,436 A | 7/1998 | Forgang et al. |
| 6,084,052 A | 7/2000 | Aufdermarsh et al. |
| 6,208,031 B1 | 3/2001 | Fraivillig |
| 6,249,259 B1 | 6/2001 | Goodman et al. |
| 6,300,762 B1 | 10/2001 | Thomas, Jr. et al. |
| 6,351,127 B1 | 2/2002 | Rosthal et al. |
| 6,452,388 B1 | 9/2002 | Reiderman |
| 6,690,170 B2 * | 2/2004 | Homan et al. ............... 324/339 |
| 2003/0038631 A1 * | 2/2003 | Kruspe et al. ............... 324/303 |

FOREIGN PATENT DOCUMENTS

| | | |
|---|---|---|
| GB | 2 303 215 | 2/1997 |
| GB | 2 380 550 | 4/2003 |

* cited by examiner

*Primary Examiner*—Tan Ho
(74) *Attorney, Agent, or Firm*—Kevin P. McEnaney; Brigitte L. Echols; Dale Gaudier

(57) ABSTRACT

The invention relates to antenna configurations for electromagnetic logging tools. The antennas have one or more electrical conductors disposed on a dielectric core. The conductor is formed on the core through plating or deposition processes and arranged such that the antenna has a first magnetic dipole moment substantially perpendicular to a longitudinal axis of the core. One embodiment includes an antenna adapted for mutual balancing using interleaved conductive paths or disks to alter the magnetic dipole moment to mutually balance the antenna system. The invention also relates to a method for producing such antenna structures.

50 Claims, 10 Drawing Sheets

SIMPLIFIED ANTENNA STRUCTURES FOR LOGGING TOOLS

CROSS REFERENCE TO RELATED APPLICATIONS

This application is a continuation-in-part of U.S. patent application Ser. No. 10/113,686, filed Mar. 29, 2002 now U.S. Pat. No. 6,690,170.

BACKGROUND OF INVENTION

1. Field of the Invention

The invention relates generally to electromagnetic well logging apparatus. More specifically, antenna structures for such well logging apparatus.

2. Background Art

Electromagnetic (EM) based instruments for measuring properties of matter or identifying its composition are well known. The nuclear magnetic resonance (NMR) technique has been used to form images of biological tissues or to determine the composition of, for example, earth formations. The values of electrical conductivity biological samples or for earth formations have been obtained through the use of electromagnetic induction tools. EM propagation well logging devices are also well known, and are used for measuring basic parameters such as amplitude and phase shift of EM waves being propagated through a medium in order to determine specific properties of the medium.

Electrical conductivity (or its inverse, resistivity) is an important property of subsurface formations in geological surveys and prospecting for oil, gas, and water because many minerals, and more particularly hydrocarbons, are less conductive than common sedimentary rocks. Thus a measure of the conductivity is often a guide to presence and amount of oil, gas, or water. Induction logging methods are based on the principle that varying electric currents, due to their associated changing magnetic flux, induce electric currents.

Propagation logging instruments generally use multiple longitudinally-spaced transmitter antennas operating at one or more frequencies and a plurality of longitudinally spaced receiver pairs. An EM wave is propagated from the transmitter antenna into the formation in the vicinity of the borehole and is detected at the receiver antenna(s). A plurality of parameters of interest can be determined by combining the basic measurements of phase and amplitude. Such parameters include the resistivity, dielectric constant and porosity of the formation as well as, for example, the degree to which the fluid within the borehole migrates into the earth formation.

The transmitter antennas on induction logging instruments generate a time-varying magnetic field when a time-varying electric current is applied to them. The time-varying magnetic field induces eddy currents in the surrounding earth formations. The eddy currents induce voltage signals in the receiver antennas, which are then measured. The magnitude of the induced voltage signals varies in accordance with the formation properties. In this manner, the formation properties can be determined.

Conventional antennas consist of coils mounted on the instruments with their axes parallel to the instrument's central or longitudinal axis. Therefore, the induced magnetic field is also parallel to the central axis of the well and the corresponding induced eddy currents make up loops lying in planes perpendicular to the well axis.

The response of the described induction logging instruments, when analyzing stratified earth formations, strongly depends on the conductive layers parallel to the eddy currents. Nonconductive layers located within the conductive layers will not contribute substantially to the response signal and therefore their contributions will be masked by the conductive layers' response. Accordingly, the nonconductive layers are not detected by typical logging instruments.

Many earth formations consist of conductive layers with non-conductive layers interleaved between them. The non-conductive layers are produced, for example, by hydrocarbons disposed in the particular layer. Thus conventional logging instruments are of limited use for the analysis of stratified formations.

Solutions have been proposed to detect nonconductive layers located within conductive layers. U.S. Pat. No. 5,781,436 describes a method that consists of selectively passing an alternating current through transmitter coils inserted into the well with at least one coil having its axis oriented differently from the axis orientation of the other transmitter coils.

The coil arrangement shown in U.S. Pat. No. 5,781,436 consists of several transmitter coils with their centers distributed at different locations along the instrument and with their axes in different orientations. Several coils have the usual orientation, i.e., with their axes parallel to the instrument axis, and therefore to the well axis. Others have their axes perpendicular to the instrument axis. This latter arrangement is usually referred to as a transverse coil, configuration.

Thus transverse EM logging techniques use antennas whose magnetic moment is transverse to the well's longitudinal axis. The magnetic moment m of a coil or solenoid-type antenna is represented as a vector quantity oriented parallel to the induced magnetic field, with its magnitude proportional to the corresponding magnetic flux. In a first approximation, a coil with a magnetic moment m can be seen as a dipole antenna due to the induced magnetic poles.

In some applications it is desirable for a plurality of magnetic moments to have a common intersection but with different orientations. For example, dipole antennas could be arranged such that their magnetic moments point along mutually orthogonal directions. An arrangement of a plurality of dipole antennas wherein the induced magnetic moments are oriented orthogonally in three different directions is referred to as a triaxial orthogonal set of magnetic dipole antennas.

A logging instrument equipped with an orthogonal set of magnetic dipole antennas offers advantages over an arrangement that uses standard solenoid coils distributed at different axial positions along the instrument with their axes in different orientations, such as proposed in U.S. Pat. No. 5,781,436.

However, it is not convenient to build orthogonal magnetic dipole antennas with conventional solenoid coils due to the relatively small diameters required for logging instruments. Arrangements consisting of solenoid coils with their axes perpendicular to the well's central axis occupy a considerable amount of space within the logging instrument.

In addition to the transmitter coils and the receiver coils, it is also generally necessary to equip the logging instrument with "bucking" coils in which the magnetic field induces an electric current in the receiver coils opposite and equal in magnitude to the current that is induced in the receiver coil when the instrument is disposed within a non-conducting medium such as, for example, air. Bucking coils can be connected in series either to the transmitter or the receiver coil. The receiver's output is set to zero by varying the axial distance between the transmitter or receiver coils and the bucking coils. This calibration method is usually known as mutual balancing.

Transverse magnetic fields are also useful for the implementation of NMR based methods. U.S. Pat. No. 5,602,557, for example, describes an arrangement that has a pair of conductor loops, each of which is formed by two saddle-shaped loops lying opposite one another and rotationally offset 90° relative to one another.

A need remains for improved antenna structures and methods for producing same, particularly for antennas having oriented magnetic dipole moments.

SUMMARY OF THE INVENTION

The invention provides an antenna adapted for a logging tool. The antenna comprises a core, the core including an electrical conductor disposed thereon such that the antenna has a first magnetic dipole moment substantially perpendicular to a longitudinal axis of the core.

The invention provides a well logging tool. The tool comprises a support having at least one antenna mounted thereon and electrical circuitry coupled to the at least one antenna; wherein the at least one antenna comprises a dielectric core, the core having an electrical conductor disposed thereon to form a conductive path, the conductive path arranged to have a first magnetic dipole moment substantially perpendicular to a longitudinal axis of the core.

The invention provides a method of producing an antenna for a logging tool. The method comprises disposing an electrical conductor on a dielectric core, the conductor forming a conductive path arranged to have a first magnetic dipole moment substantially perpendicular to a longitudinal axis of the core; and adapting the electrical conductor to be coupled with independent circuitry.

DETAILED DESCRIPTION

Figure 1:
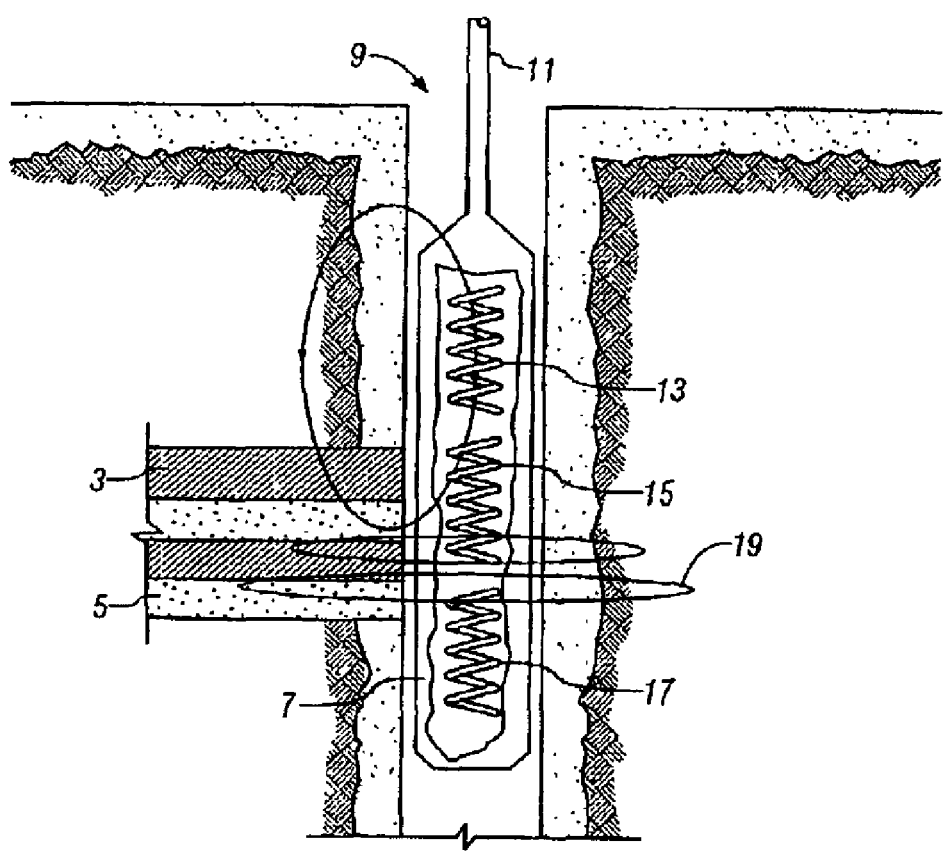
FIG. 1 shows a logging instrument disposed in a well bore penetrating an earth formation.

FIG. 1 shows a well (9) extending into an earth formation that includes layers of conductive (3) and non-conductive (5) material. A logging tool (7) is disposed within the well (9) on a wireline (11). The tool (7) includes transmitter coils (13), receiver coils (15) and bucking coils (17) with their axes parallel to the tool axis and thus the well axis. The magnetic field produced by the transmitter coils (13) induce eddy currents (19), which are detected by the receiver coils (15).

Figure 2A:
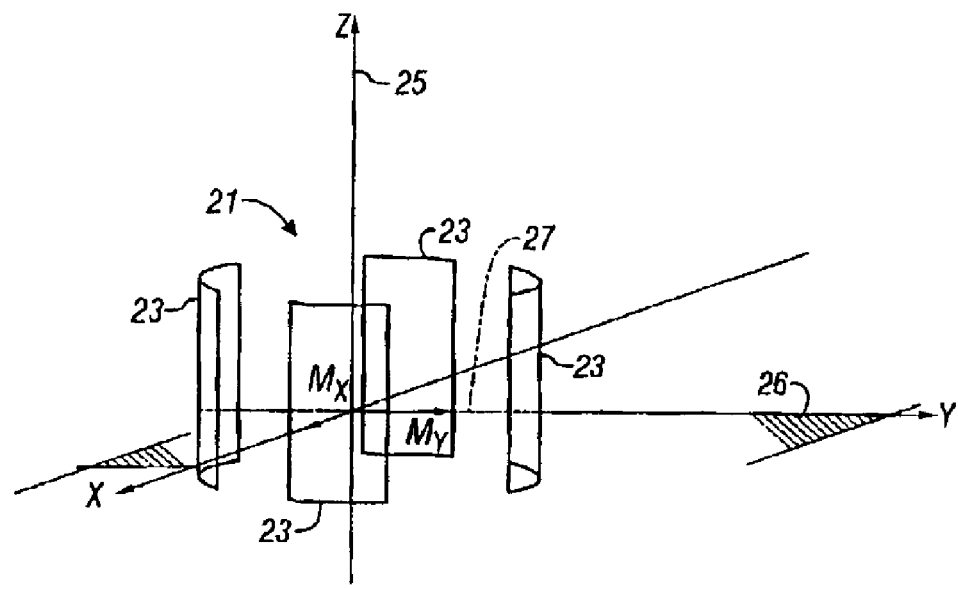
FIG. 2A is a schematic diagram of a transverse electromagnetic apparatus in accord with the invention.

FIG. 2A shows an arrangement for a transverse EM apparatus (21) in accordance with one embodiment of the invention. The transverse EM apparatus (21) includes a plurality of coils (23) disposed around a central axis (25) such that the coils" normal vectors (27) are perpendicular to the central axis (25).

Figure 2B:
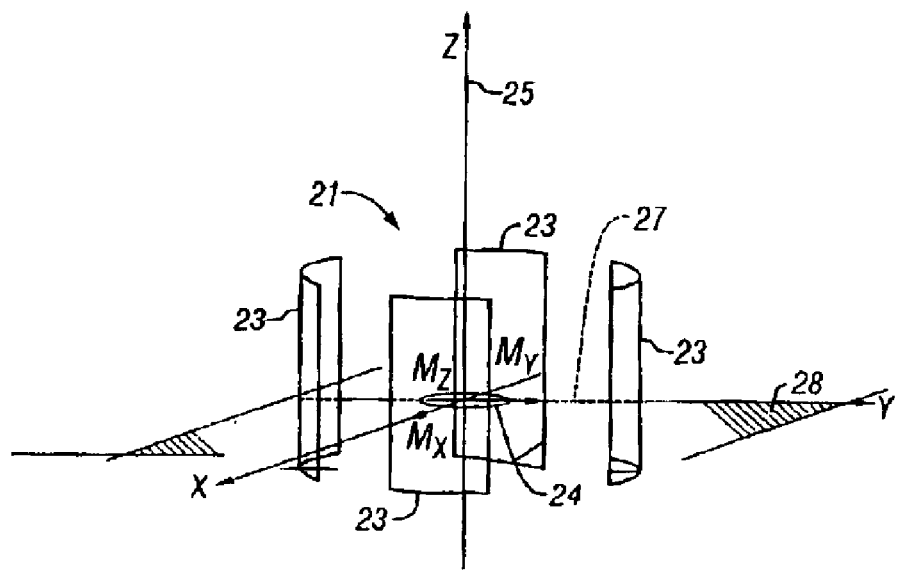
FIG. 2B is a schematic diagram of a transverse electromagnetic apparatus in accord with the invention.

FIG. 2B shows another arrangement for the transverse EM apparatus (21) in accordance with an embodiment of the invention. In this case an additional coil (24) has been added to the arrangement of FIG. 2A such that its normal vector is parallel to central axis (25).

FIGS. 2a and 2b show an orthogonal set of magnetic dipole antennas whose magnetic moments all have a common origin. This will provide, on a plane (26,28), i.e. at the same well depth, magnetic fields pointed in directions x,y for the arrangement of FIG. 2A and x,y,z for the arrangement of FIG. 2B. A triaxial orthogonal set of magnetic dipole antennas, located at a selected distance from the transmitter, will correspondingly be able to receive and detect the eddy currents that travel in loops parallel and perpendicular to the tool axis.

Figure 3:
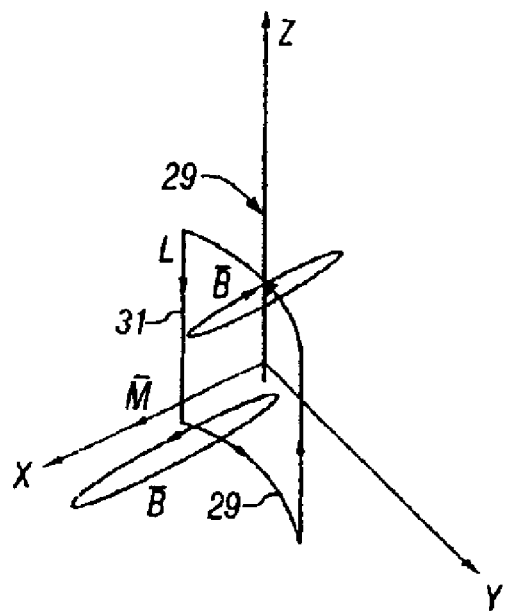
FIG. 3 is a schematic diagram of an antenna loop in accord with an embodiment of the invention.

FIG. 3 shows one of the plurality of coils (23) of the invention in more detail. A coil (23) consists of two arcs (29) with their ends united by two lines (31). A current i traveling around the coil (23) induces a magnetic field B that surrounds each element of the coil. The y and z components of the magnetic field sum to zero due to the symmetry of the coil. Therefore, the coil has a magnetic moment m only parallel to the x coordinate.

Figure 4:
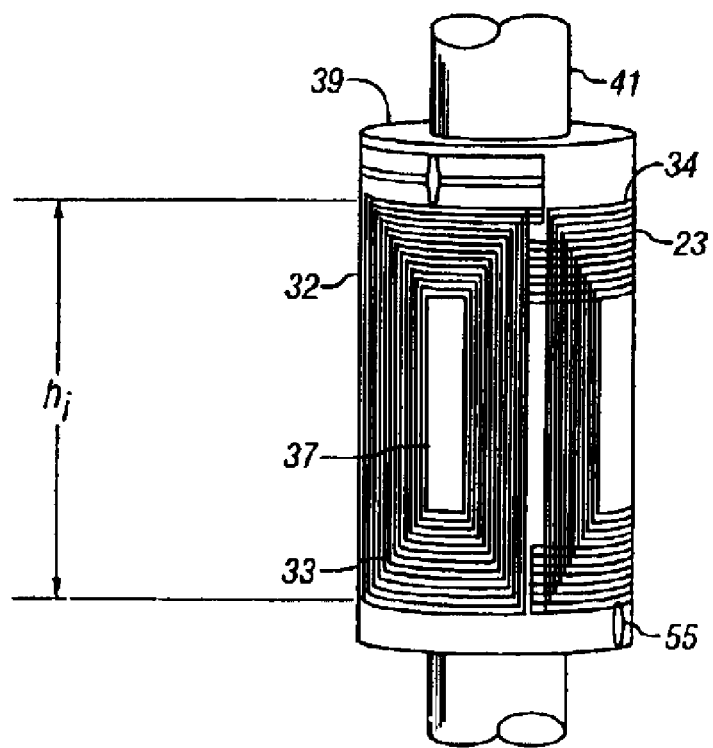
FIG. 4 is a schematic diagram of a transverse electromagnetic apparatus in accord with the invention.

FIG. 4 shows an embodiment of a coil (23) of the invention. The coil (23) is composed of several loops (34) placed one within another. According to an embodiment of the invention, the coil (23) can be obtained by winding a single wire (55) around a central point (37).

The magnetic moments of the transverse dipole antenna embodiments of the invention can be determined as explained below.

Figure 11:
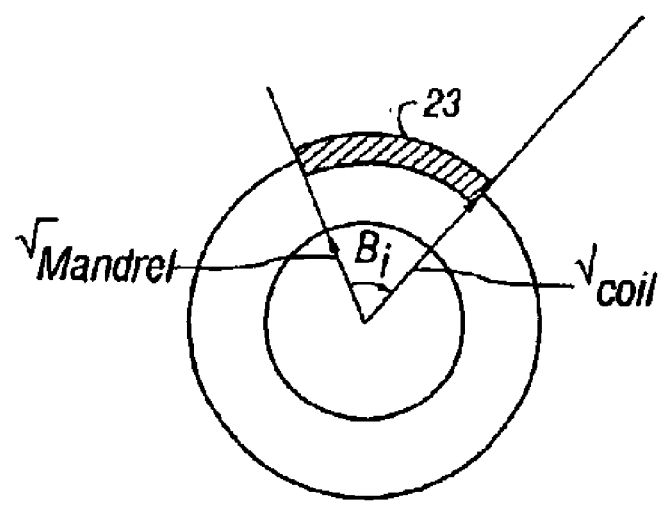
FIG. 11 illustrates a top view of the transverse electromagnetic apparatus as shown in FIG. 4.

The modulus ($M_x$) of the magnetic moment m for a pair of coils (23) is equal to:

$$M_x = 2I_x N_x A_x^{eff}, \quad (1)$$

where $I_x$ is the current and $N_x$ is the number of turns and $A_x^{eff}$ is the approximate effective area defined by $$A_x^{eff} = 2\left(r_{coil} - \frac{r_{mandrel}^2}{r_{coil}}\right) \sum_i h_i \sin\left(\frac{\beta_i}{2}\right) \quad (2)$$

where $h_i$ is the saddle coil height, $r_{coil}$ is the arc radius, $r_{mandrel}$ is the inner core radius, and $\beta_1$ is the angle subtended by the arc formed by the coil as can be seen in FIG. 11. This result is a first approximation because the transverse magnetic moment is summed over all the turns forming the coil, since the angle $\beta_1$ changes at each turn. It can be seen from Equation 2 that the magnetic moment can be increased by increasing the height of the coil, where the arc radius is assumed constant.

The modulus of the magnetic moment $M_x$ of a saddle coil can be greater than the modulus of magnetic moment along the longitudinal axis of a solenoid coil for identical currents $I_x$ and $I_z$, where $I_z$ is current of the solenoid coil typically used in well logging instruments. It can be shown that $M_z$ of an axial solenoid wrapped on an insulator about a metal mandrel is $$M_x = I_x N_x A_x^{eff} \quad (3)$$

where $I_x$ is the axial current and $N_x$ is the axial number of turns and $A_x^{eff}$ is the effective area defined by $$A_x^{eff} = \pi(r_{coil}^2 - r_{mandrel}^2) = \pi(r_{coil} - r_{mandrel})(r_{coil} + r_{mandrel}) \quad (4)$$

where $r_{coil}$ is the coil radius.

Next, the transmitter saddle-coil can be examined as a circuit constrained by its electrostatic characteristics. It can be shown that the resistance R, the inductance L, and the capacitance C are all controlled by the geometry of the wire and/or trace. It is desirable to have a high quality factor Q, for example, for the transmitter, Q is defined as $$Q = \frac{\omega_0 L}{R} \quad (5)$$

where $\omega_0$ is the resonant angular frequency of the circuit,

R is the resistance, and

L is the self-inductance of the saddle coil. The resistance of the coil is defined as $$R = \frac{\rho l}{A}[1 + \alpha(T - T_0)] \quad (6)$$

where $\rho$ is the resistivity, l is the total length of the wire,

T is the temperature, $T_0$ is the reference temperature, and

A is the cross sectional area of the conductors that form the corresponding coil, ignoring skin depth effect. The approximate self-inductance of a saddle coil is given by the expression:

$$L = 0.004 \left[ \begin{array}{l} a \operatorname{Ln}\left(\frac{2a}{\rho}\right) + b \operatorname{Ln}\left(\frac{2b}{\rho}\right) + 2\sqrt{a^2 + b^2} - \\ a \sinh\left(\frac{a}{b}\right) - b \sinh\left(\frac{b}{a}\right) - 2(a+b) + \frac{\mu}{4}(a+b) \end{array} \right] N^{\frac{5}{3}}. \quad (7)$$

where a is the average width of the coil, b is the average height of the coil, $\rho$ is the radius of the wire, $\mu$ is the permeability constant, and N is the number of turns.

It is desirable to obtain a quality factor (shown in Eq. 5) of around 10 to 20 for, for example, a saddle-coil transmitter. This can be achieved by increasing the resonance frequency of the corresponding circuit, increasing L or decreasing R. A large quality factor Q may be achieved by using higher operating frequencies, with the caveat that the operating frequency affects the depth of investigation. For example, typical induction-type measurements would require frequencies around 15 kHz to 50 kHz. L can be increased by increasing b and/or N, but this would, but this would place demands on the magnitude of the capacitor $$(\omega_0 = 1\sqrt{LC})$$

needed to series or parallel tune, for example, the transmitter circuit. It is also possible to decrease R by increasing the cross sectional area of the conductor.

The self-resonance of the saddle coils is given by $$\omega_s = \frac{1}{\sqrt{LC_{dist}}} \quad (8)$$

where $C_{dist}$ is the distributed capacitance per unit length of parallel wires. The approximate formula for the capacitance of two parallel wires is $$C_{dist} = \frac{\varepsilon \pi}{\cosh^{-1}\left(\frac{c}{a}\right)} \quad (9)$$

where c is the distance between the conductors and a is the radius of the conductors. It is preferable that the resonance frequency $\omega_0$ be less than $w_s/3$.

Examination of the derived equations shows that the values of R, L, and C for the coils (23) can be controlled by varying, for example, the coil height $h_i$ and the of turns N that form the coil. Equation 6 shows that the resistance R can be varied by altering these parameters. Similarly, the capacitance C can be controlled by either increasing or decreasing the distance between the conductors that form each turn, as derived from Equation 9.

A transverse EM apparatus (32) according to one of the embodiments of the invention is shown in FIG. 4. The apparatus consists of a core (39) made out of dielectric material on which a plurality of coils (23) are mounted. The dielectric material can be ceramic, fiberglass, or other suitable materials and composites known in the art. According to one embodiment of the invention, the core (39) consists of an annular cylinder in which a metal rod (41) is inserted.

Figure 5A:
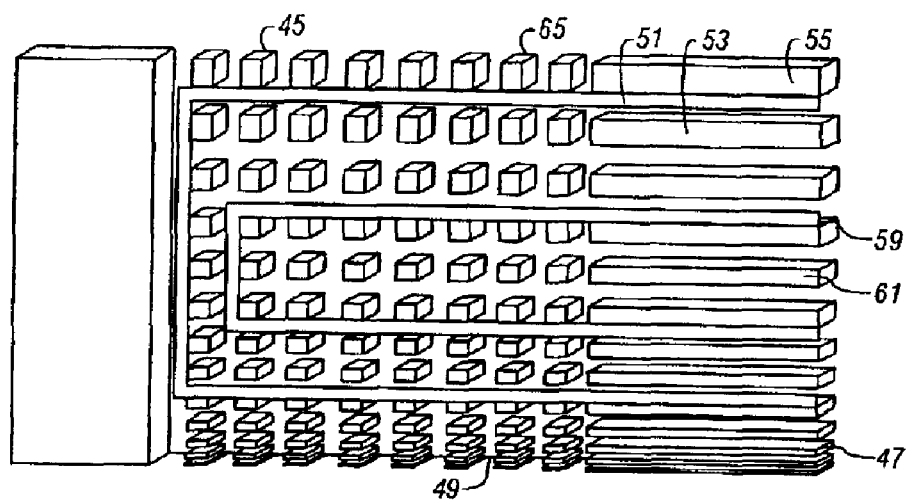
FIG. 5A is a diagram of a core structure of a transverse electromagnetic apparatus in accord with the invention.
Figure 5B:
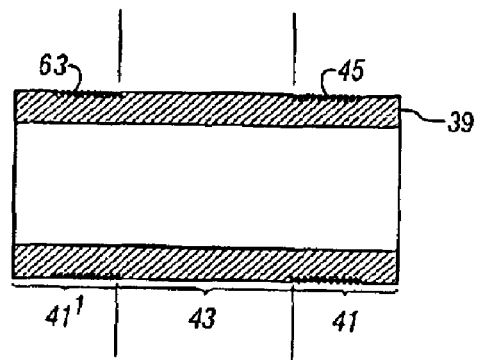
FIG. 5B is a cross section of the core structure of FIG. 5A.

The invention includes several configurations for disposing the coils (23) on the core (39). FIGS. 5A and 5b show a core (39) in which specific cuts have been made to guide and retain the loops. The core (39) is composed of pin sections (41,41') and a channel section (43). The pin sections (41,41') are located at the core's ends and include a plurality of pins (45) in a matrix type arrangement. The channel section (43) is located between the pin sections (41,41') and is formed by a plurality of channels (47) that are parallel to the core's longitudinal axis (represented by a dashed line in FIG. 5B) and aligned with the channels (49) formed between the columns of the pin's matrix arrangement. The channels (49) provide guiding paths for inserting the conductors or wires (55) that form the coil(s).

A loop (51) is formed by inserting the wire in the channels (47) and wrapping a desired area (53) that includes both pin sections (41,41') and the channel section (43). For example, in order to form a loop, the wire (55) is inserted at one pin section (41') in a channel (49), the wire is then turned at a selected pin (45) and brought to the opposite pin section (41) by introducing it in the corresponding channels (47) of the channel section (43). Similarly, at the opposite pin section (41) the wire, exiting the channel (47) from the channel section (43), enters a corresponding channel (49). The wire (55) follows the channel (49) till the desired pins (45) are reached where the wire (55) is turned around and returned to the other pin section (41') through a corresponding channel (47). An additional loop (59) can be placed within a previously made loop (51) by repeating the procedure to cover a smaller area (61). The transverse EM apparatus (32) of FIG. 4 is an embodiment made by repeating this procedure to form a structure with as many coils as desired.

In one embodiment of the invention the pins (45) are slanted with respect to the core's (39) outer surface (63). The slanting is directed toward the core (39) ends. The pins' orientation enables the wire (55) to be maintained in contact with the core's outer surface (63). Thus the wire (55) is also maintained within the corresponding channels (49). The slanted pins (45) also permit the wires to be held tighter to the core's outer surface, eliminating slack in the wire. The corners (65) of the slanted pins may be rounded to avoid damage to the wire (55).

Figure 6:
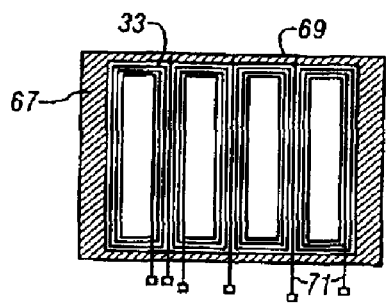
FIG. 6 is a schematic diagram of a coil assembly in accord with the invention.

FIG. 6 shows another embodiment of the invention. In this embodiment, the coils (33) are affixed to an insulating sheet (67) according to the desired pattern. The coils (33) may be formed from any suitable electrical conductor, including wire or metallic foil. Alternatively, the coils may be formed by the deposition of conductive films on the insulating sheet as known in the art. Adhesives (e.g. polyimides, epoxies, and acrylics) may be used to bond the conductor to the insulating sheet.

In the embodiment of FIG. 6, a plurality of coils (33) are disposed side by side and placed on an insulating sheet (67) to form a flexible circuit (69). Conductors (71) provide the corresponding electrical connection for energizing the coils (33). The flexible circuit (69) can be conformed about the core's exterior and attached to it via adhesives or mechanical fasteners. The insulating sheet can be any electrically non-conductive or dielectric film substrate, such as polyimide film or a polyester film having a thickness selected to enable bending or flexing. Methods used to produce the insulating sheet are described in U.S. Pat. No. 6,208,031, incorporated by reference. The conductors (71) that are used to interconnect the coils (33) are preferably placed on the layers closest to the outside diameter of the invention. This aids in minimizing conductor (71) compression and forces the conductors (71) into tension, which greatly improves the reliability of the invention.

The invention also includes techniques for mutually balancing a dipole antenna. FIGS. 7a and 7b show independently mutually balanced dipole antenna (73,74) embodiments of the invention. One technique entails selecting one or more loops within a main coil (75, 76). The selected loops constitute a separate coil (77, 78), referred to as a mutual balancing coil.

A mutual balancing process of the invention entails cutting or leaving out several loops between the mutual balancing coil (77, 78) and the main coil (75, 76), thereby leaving a gap (79, 80) between the coils, as shown in FIGS. 7a and 7b. In FIG. 7B, the mutual balancing arrangement is adapted to the core (74) as describe above, having channels to host the corresponding mutual balancing coil (78) and main coil (76), separated by a gap (80).

Figure 7C:
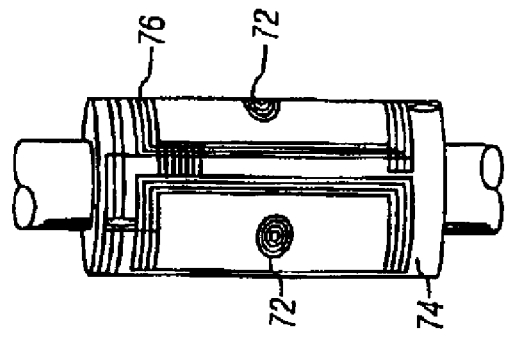
FIG. 7C is a schematic diagram of another mutual balancing coil configuration in accord with the invention.
Figure 7B:
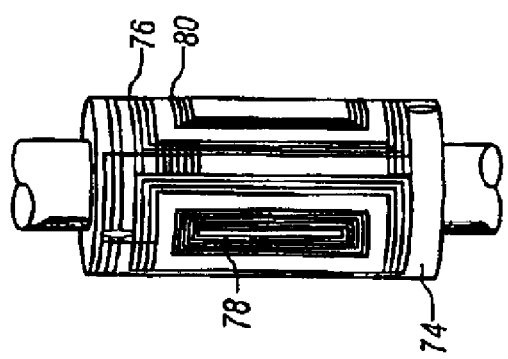
FIG. 7B is a schematic diagram of another mutual balancing coil configuration in accord with the invention.
Figure 7A:
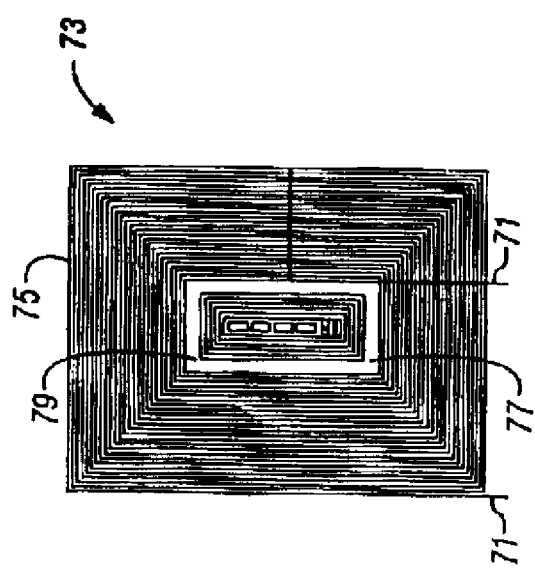
FIG. 7A is a schematic diagram of a mutual balancing coil configuration in accord with the invention.

FIG. 7C shows another antenna (74) embodiment of the invention adapted for mutual balancing. According to this embodiment, individual conductive elements or disks (72) are placed on the antenna within the main coil (76). This embodiment allows one to balance the antenna by placing appropriately sized disks (72) on the antenna until the desired balancing is achieved. The disks (72) may be formed of any conductive element, e.g. copper. The disks (72) may be bonded or affixed to the substrate using any suitable adhesive. The disk(s) (72) may also be placed within a recess formed in the substrate itself (not shown). Alternatively, the disk(s) may also be affixed to the sealer or potting compound (not shown) commonly used to mount antennas on logging instruments as known in the art.

The interleaved conductive loops forming the balancing coils (77, 78) and the conductive disks (72) excite opposing currents (by Lenz's law) that oppose the generated magnetic field to effectively reduce the magnetic moment of the main coil (75,76). These mutually balancing antennas of the invention provide greater flexibility for the placement of receiver arrays at different points along the tool axis. The mutual balancing antenna configurations of the invention may be used as receiver or bucking antennas.

Figure 8:
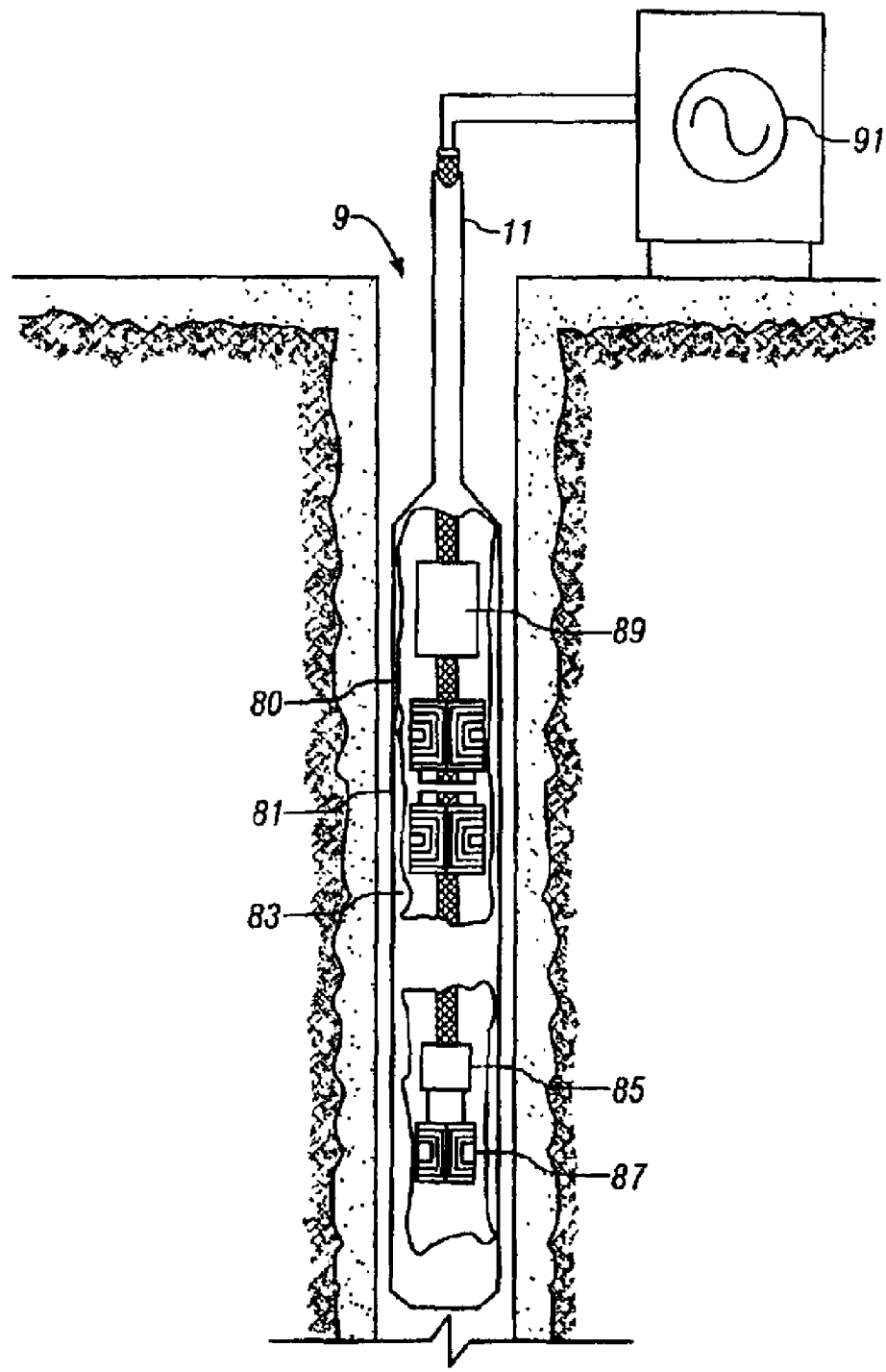
FIG. 8 is a schematic diagram of a logging tool implementation in accord with the invention.

FIG. 8 shows a logging tool (80), according to one embodiment of the invention, disposed within a well on a wireline (11). The tool (80) has a transmitter antenna (81), a bucking antenna (83), and a receiver antenna (87). The bucking antenna (83) can be connected in inverse polarity to either the transmitter antenna (81) or to the receiver antenna (87). Transmitter electronic circuitry (89) is connected to the transmitter antenna (81) to provide time-varying electric currents to induce time-varying magnetic fields. Power supply (91) feeds the circuitry (89). Receiver circuitry (85) is connected to the receiver antenna (87) to detect and measure resulting EM signals.

According to one embodiment of the invention, the bucking antenna (83) can be omitted by using a transmitter antenna (81) or a receiver antenna (87) adapted for independent mutual balancing as shown in FIGS. 7a, 7b, and 7c.

Figure 9:
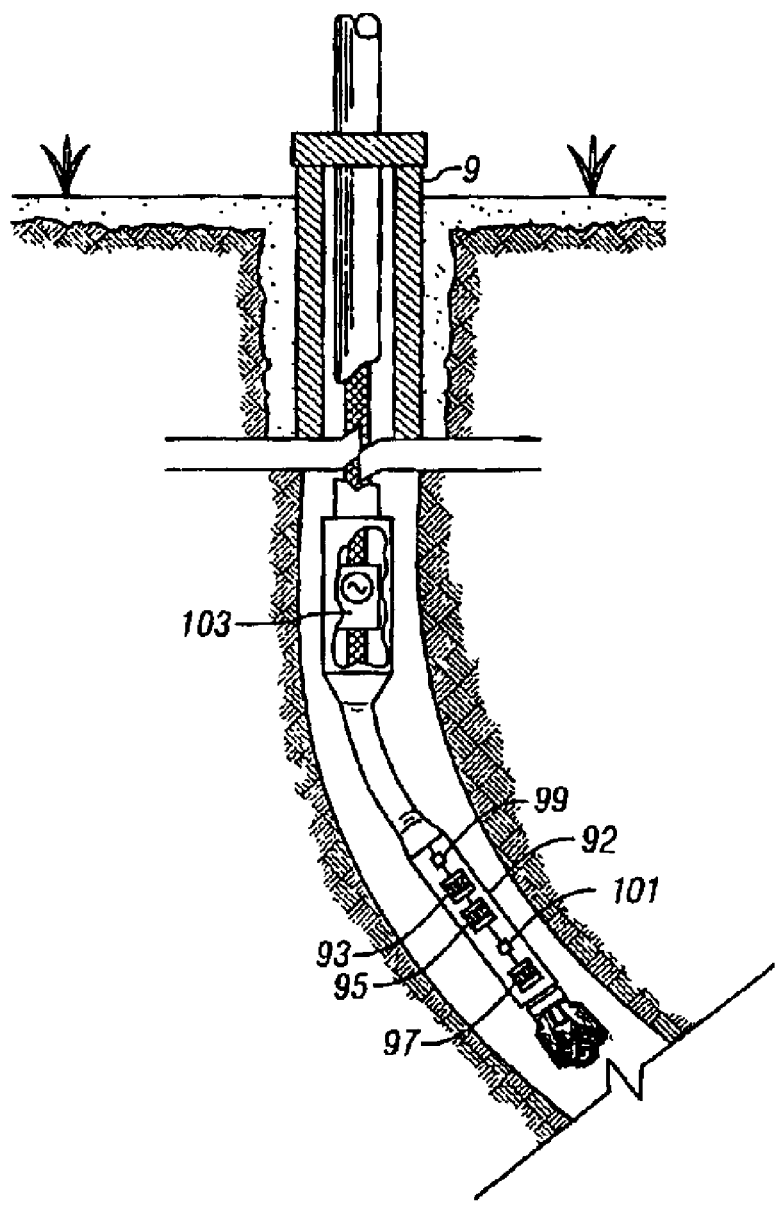
FIG. 9 is a schematic diagram of another logging tool implementation in accord with the invention.

FIG. 9 shows a drilling tool (92) disposed in a well (9) according to one embodiment of the invention. The drilling tool (92) has a transmitter antenna (93), a bucking antenna (95), and a receiver antenna (97). The bucking antenna (95) can be connected with an inverse polarity to either the transmitter antenna (93) or to the receiver antenna (97). The transmitter electronic circuitry (99) is connected to the transmitter antenna (93) to provide time-varying electric currents to induce time-varying magnetic fields. Power supply (103) feeds the circuitry (99). Receiver circuitry (101) is connected to the receiver antenna (97) to detect and measure resulting EM signals. The bucking antenna (95) may also be omitted in another embodiment by using antennas adapted for independent mutual balancing as shown in FIGS. 7a, 7b, and 7c. However, this may reduce effectiveness where one desires $M_x$, $M_y$, $M_z$ to have a common origin.

Those skilled in the art will appreciate that the antenna apparatus of the invention are not limited to use in any one particular type of measurement or exploration operation and that they may be disposed within a well bore on any type of support member, e.g., on coiled tubing, drill collars, or wireline tools.

Parameters for the independently mutually balanced antennas (77, 78) of the invention are now presented. Cancellation of the undesired mutual coupling results in the following relationship:

$$\frac{N_B A_B}{L_B^3} = \frac{N_R A_R}{L_R^3} \qquad (10)$$

where the subscripts B and R represent the mutual balancing coil and the receiver coil, respectively, and N is the number of turns, A is the effective area of the coil, and L is the distance from the transmitter coil.

Solving Equation 10 for $A_B$ gives the expression:

$$A_B = \frac{N_R}{N_B}\left(\frac{L_B}{L_R}\right)^3 A_R \qquad (11)$$

Translation of the transverse coil for a small $\Delta L_b$ is problematic, therefore a comparable $\Delta A_B$ is added. To this end, the following relationship of a physical derivative is considered:

$$\Delta A_B = \frac{dA_B}{dL_B}\Delta L_B \qquad (12)$$

For this statement to be true, the loop of area $\Delta A_B$ should have an inductance much greater than its DC resistance. This is generally true because the resistance of a loop is typically in the sub-milli-ohm range. The inductance of a small circular loop of wire is:

$$L_0 = \mu(2r-a)\left[\left(1-\frac{k^2}{2}\right)K(k) - E(k)\right] \qquad (13)$$

where a is the conductor radius, r is the loop radius, K(k) and E(k) are elliptic integrals, and $$k^2 = \frac{4r(r-a)}{(2r-a)^2} \qquad (14)$$

Put another way, this loop should generate a small opposing complex voltage in the receiver/bucking coil circuit. Equation 12 can be rewritten as $$\Delta A_B = 3A_R \Delta L_B \left(\frac{N_R}{N_B}\right)\frac{L_B^2}{L_R^3}. \qquad (15)$$

The bucking loop radius can thus be shown to be $$r = \sqrt{\frac{\Delta A_B}{\pi}} \qquad (16)$$

or $$r = \left(\frac{3A_B \Delta L_B}{\pi L_B}\right)^{1/2}.$$

Figure 10:
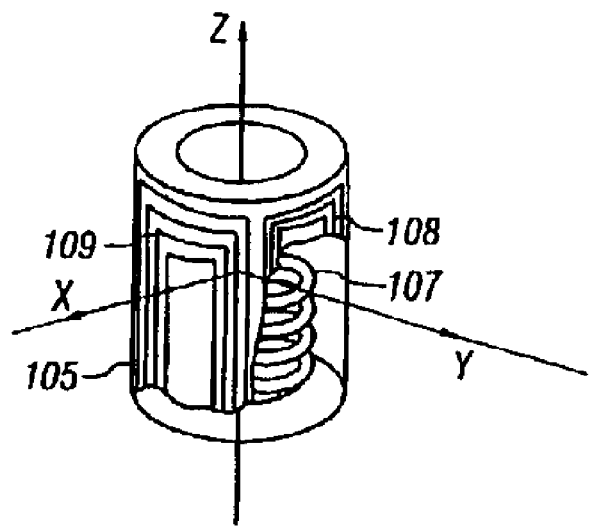
FIG. 10 is a schematic diagram of an antenna configuration in accord with the invention.

FIG. 10 shows an arrangement for a transmitter or receiver antenna according to an embodiment of the invention. This arrangement consists of a transverse EM antenna pair (105) (similar to FIG. 4) combined with a solenoid coil (107) oriented so that its dipole moment is parallel to the longitudinal axis of the instrument (represented by the z-axis). The solenoid coil (107) is surrounded by coils (109) that have their magnetic moments perpendicular to the solenoid's magnetic moment.

Other embodiments of the invention may be implemented by "printing" the conductive coil(s) or elements directly onto the non-conductive core material through plating or other conventional deposition processes. One such embodiment comprises plating the entire outer diameter of the core with a conductive material and etching away the excess to form the coil. Another embodiment entails selectively plating only the shape of the coil onto the core through the use of masking techniques known in the art. Additional embodiments may also be implemented using other thin film growth techniques known in the art, such as spray coating and liquid phase epitaxy.

Several processes are known to entirely or selectively coat a dielectric material with a conductive material such as copper. These include, but are not limited to, electroless plating and the various vapor deposition processes. These techniques allow one to produce a copper (or other conductive material) overlay in the shape of a saddle coil onto a ceramic or other dielectric material core.

Electroless plating is one technique that may be used to implement the invention. This plating process enables the metal coating of non-conductive materials, such as plastics, glasses and ceramics. Compared to electroplating, the coatings derived from electroless plating are usually more uniform. The deposition is carried out in liquids (solutions), and is based on chemical reactions (mainly reductions), without an external source of electric current. Electroless plating is further described in Glenn O. Mallory & Juan B. Hajdu, Electroless Plating (William Andrew Publishing, ISBN 0-8155-1277-7) (1990).

Other embodiments of the invention may be implemented using known thin film deposition techniques. Deposition is the transformation of vapors into solids, frequently used to grow solid thin film and powder materials. Deposition techniques are further described in Krishna Seshan, Handbook of Thin Film Deposition Processes and Techniques, (William Andrew Publishing, ISBN 0-8155-1442-5) (2001).

Figure 12A:
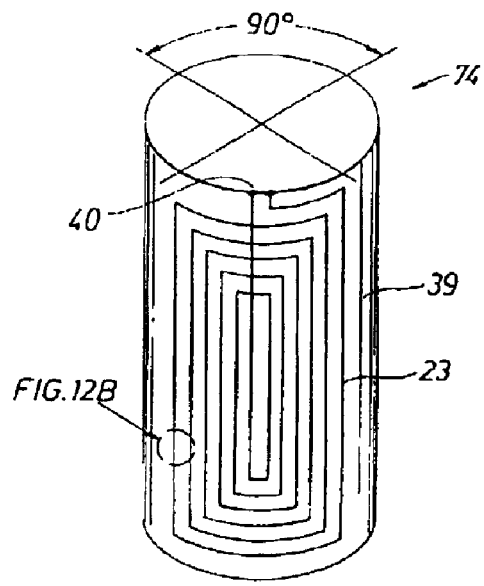
FIG. 12A shows an antenna configured with a printed conductive element in accord with the invention.
Figure 12B:
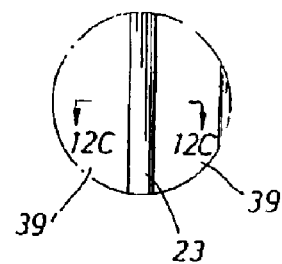
FIG. 12B shows an exploded view of the indicated antenna section of FIG. 12A.
Figure 12C:
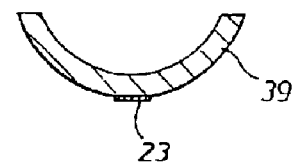
FIG. 12C shows a cross-sectional view taken along a section line of FIG. 12B.

FIG. 12A shows an embodiment of the invention derived using a thin film technique as described above. As described above, the core (39) may be formed of any suitable dielectric material. It will be appreciated that practically any desired coil patterns may be derived using these techniques, including the mutual balancing configurations disclosed herein. Conductive disks (see item 72 in FIG. 7C) may also be added to the core (39) using these techniques. Connection points are shown at (40) for coupling the conductors to independent circuitry. FIG. 12B shows an exploded view of the indicated antenna section of FIG. 12A, illustrating the conductor disposed on the core (39) surface. In this embodiment the non-coated core (39') has been masked during plating. Alternatively, the plating may also be removed from this area to form the desired pattern. FIG. 12C shows a cross-sectional view of the antenna (74) taken along a section of FIG. 12B. The conductive material is disposed on the outer surface of the core (39) to form the coil (23).

Advantages of these printed coil embodiments include a more robust joint between the conductor and the dielectric core, which may be stronger than either material alone. Thus providing an antenna that can withstand the stresses and strains encountered in the downhole environment, particularly in while-drilling applications. The core is also easier to produce since it is basically featureless.

Figure 13:
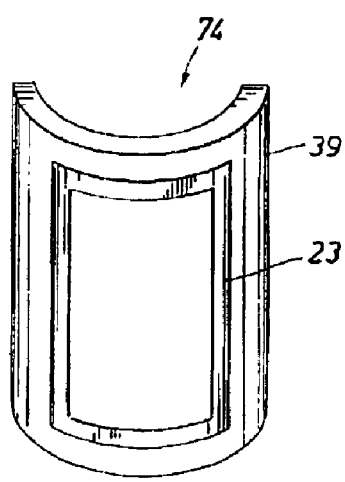
FIG. 13 shows an antenna embodiment in accord with the invention.

While the antennas disclosed herein are generally shown as a one-piece annular surface of revolution, other embodiments of the invention may be implemented with the core formed in individual segments having individual conductive elements disposed thereon by any of the disclosed techniques. FIG. 13 shows such an embodiment. The core (39) provides a base forming a surface covering a ninety-degree sector. An independent saddle coil (23) is disposed thereon. Although the antenna (74) of FIG. 13 has an arcuate shaped core (39), it may be formed in practically any desired shape.

Figure 14:
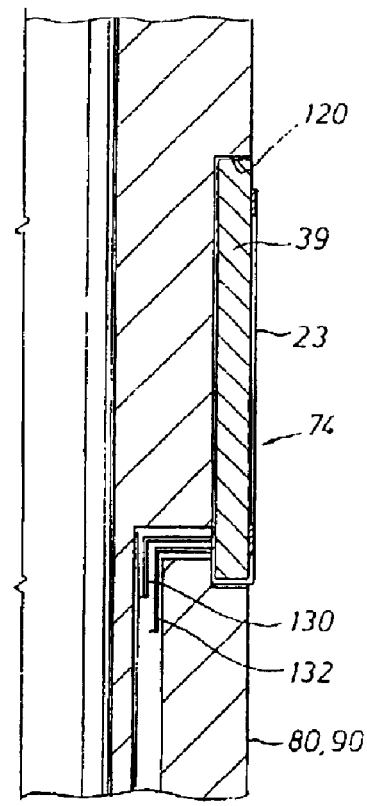
FIG. 14 is a schematic view of an antenna disposed within a downhole tool in accord with the invention.

Another embodiment of the invention may include a semi-curved or flat core (39), which can be disposed within a pocket or recess (120) formed in the logging/drilling tool (80, 90) as shown in FIG. 14. Feed thru wires (130/132) are run along the recess to connect to the coil (23) on the core (39) surface. The wires (130/132) couple the coil (23) to conventional electronics (not shown) adapted to energize the antenna with alternating current to transmit electromagnetic energy or to receive signals responsive to the receipt of electromagnetic energy as known in the art. A rubber overmold may also be disposed over the core (39) segment to completely encompasses the antenna (74) (not shown). A shield (not shown) may also be placed over the antenna (74) to protect the coil or provide electromagnetic energy focusing as known in the art. One or more of these independent antennas 74 could be placed on a downhole tool to provide a transverse magnetic dipole where desired with relative ease and repairs or replacement could be done in the field, reducing cost and delay.

Figure 15:
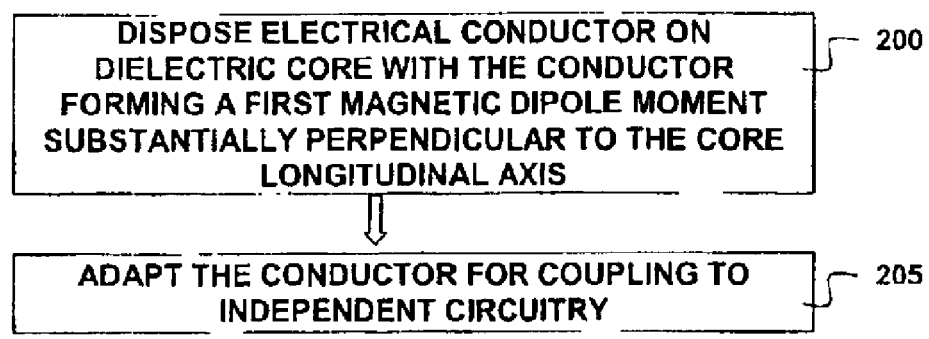
FIG. 15 is a flow chart of a process for producing an antenna in accord with the invention.

FIG. 15 illustrates a process for producing an antenna of the invention. An electrical conductor is disposed on a dielectric core at step (200). The conductor forms a conductive path arranged to have a first magnetic dipole moment substantially perpendicular to a longitudinal axis of the core. At step (205), the electrical conductor is adapted to be coupled with independent circuitry as known in the art.

While the invention has been described with respect to a limited number of embodiments, those skilled in the art will appreciate that other embodiments can be devised which do not depart from the scope of the invention as disclosed herein. For example, the antennas of the invention may be configured using a combination of printed and wired coils. Multiple overlaid substrates may also be used to achieve modified couplings or to alter the magnetic moment(s) as desired. Using multiple-layered substrates would allow for antennas to be collocated on the support, e.g., a bucking and a receiver antenna. It will also be appreciated that the embodiments of the invention are not limited to any particular material for their construction. Any suitable material or compounds (presently known or developed in the future) may be used to form the embodiments of the invention provided they allow for operation as described herein.

What is claimed is:

1. An antenna adapted for a logging tool, comprising:
   a core;
   the core including an electrical conductor disposed thereon such that the antenna has a first magnetic dipole moment substantially perpendicular to a longitudinal axis of the core.

2. The antenna of claim 1 wherein the antenna is adapted to transmit or receive electromagnetic energy.

3. The antenna of claim 2 wherein the core consists of a dielectric material.

4. The antenna of claim 3 wherein the conductor is disposed on the outer surface of the core.

5. The antenna of claim 4 wherein the conductor is plated onto the core.

6. The antenna of claim 5 wherein the core includes an arcuate shaped outer surface.

7. The antenna of claim 6 wherein the core forms a surface of revolution.

8. The antenna of claim 7 wherein the core forms a cylinder having open ends.

9. The antenna of claim 4 wherein the conductor consists of a conductive material deposited on the core.

10. The antenna of claim 9 wherein the core includes an arcuate shaped outer surface.

11. The antenna of claim 10 wherein the core forms a surface of revolution.

12. The antenna of claim 11 wherein the core forms a cylinder having open ends.

13. The antenna of claim 4 further comprising a second electrical conductor disposed on the core such that the antenna has a second magnetic dipole moment substantially perpendicular to the longitudinal axis of the core.

14. The antenna of claim 13 wherein the second magnetic dipole moment is substantially perpendicular to the first magnetic dipole moment.

15. The antenna of claim 13 wherein the second conductor is plated onto the core.

16. The antenna of claim 13 wherein the second conductor consists of a conductive material deposited on the core.

17. The antenna of claim 13 further comprising another independent electrical conductor disposed on the core, the conductor adapted to alter the first or second magnetic moment.

18. The antenna of claim 17 wherein the independent conductor forms a closed loop.

19. The antenna of claim 17 wherein the independent conductor forms a disk.

20. A well logging tool comprising:
   a support having at least one antenna mounted thereon; and
   electrical circuitry coupled to the at least one antenna,
   wherein the at least one antenna comprises a dielectric core, the core having an electrical conductor disposed thereon to form a conductive path, the conductive path arranged to have a first magnetic dipole moment substantially perpendicular to a longitudinal axis of the core.

21. The logging tool of claim 20 wherein the antenna is adapted to transmit or receive electromagnetic energy.

22. The logging tool of claim 21 wherein the conductor is plated onto the core.

23. The logging tool of claim 22 wherein the core forms a surface of revolution.

24. The logging tool of claim 23 wherein the core forms a cylinder having open ends.

25. The logging tool of claim 21 wherein the conductor consists of a conductive material deposited on the core.

26. The logging tool of claim 25 wherein the core forms a surface of revolution.

27. The logging tool of claim 26 wherein the core forms a cylinder having open ends.

28. The logging tool of claim 20 further comprising a second electrical conductor disposed on the core to form a conductive path, the conductive path arranged to have a second magnetic dipole moment substantially perpendicular to the longitudinal axis of the core.

29. The logging tool of claim 28 wherein the second magnetic dipole moment is substantially perpendicular to the first magnetic dipole moment.

30. The logging tool of claim 28 wherein the second conductor is plated onto the core.

31. The logging tool of claim 28 wherein the second conductor consists of a conductive material deposited on the core.

32. The logging tool of claim 28 further comprising another independent electrical conductor disposed on the core, the independent conductor adapted to alter the first or second magnetic moment.

33. The logging tool of claim 32 wherein the independent conductor forms a closed loop.

34. The logging tool of claim 32 wherein the independent conductor forms a disk.

35. The logging tool of claim 21 wherein the support is adapted for disposal within a well bore on one of a wireline, a drill collar, or coiled tubing.

36. A method of producing an antenna for a logging tool, comprising:
 (a) disposing an electrical conductor on a dielectric core, the conductor forming a conductive path arranged to have a first magnetic dipole moment substantially perpendicular to a longitudinal axis of the core; and
 (b) adapting the electrical conductor to be coupled with independent circuitry.

37. The method of claim 36 wherein the antenna is adapted to transmit or receive electromagnetic energy.

38. The method of claim 37 wherein step (a) comprises plating the conductor onto the core.

39. The method of claim 38 wherein the core forms a surface of revolution adapted to be placed in juxtaposition with a curved surface.

40. The method of claim 39 wherein the core forms a cylinder having open ends.

41. The method of claim 37 wherein step (a) comprises depositing a conductive material onto the core to form the conductor.

42. The method of claim 41 wherein the core forms a surface of revolution adapted to be placed in juxtaposition with a curved surface.

43. The method of claim 42 wherein the core forms a cylinder having open ends.

44. The method of claim 36 further comprising disposing a second electrical conductor on the core such that the antenna has a second magnetic dipole moment substantially perpendicular to the longitudinal axis of the core.

45. The method of claim 44 wherein the second magnetic dipole moment is substantially perpendicular to the first magnetic dipole moment.

46. The method of claim 44 wherein disposing the second conductor comprises plating the conductor onto the core.

47. The method of claim 44 wherein disposing the second conductor comprises depositing a conductive material onto the core to form the conductor.

48. The method of claim 44 further comprising disposing another independent electrical conductor on the core, the conductor adapted to alter the first or second magnetic moment.

49. The method of claim 48 wherein the independent conductor forms a closed loop.

50. The method of claim 48 wherein the independent conductor forms a disk.

* * * * *